(No Model.)

C. J. BAILEY.
BRUSH.

No. 404,588. Patented June 4, 1889.

Witnesses:
Edgar A. Goddin
Frederick L. Emery

Inventor:
Charles J. Bailey,
by Crosby & Gregory.
Attys.

UNITED STATES PATENT OFFICE.

CHARLES J. BAILEY, OF NEWTON, MASSACHUSETTS.

BRUSH.

SPECIFICATION forming part of Letters Patent No. 404,588, dated June 4, 1889.

Application filed November 9, 1888. Serial No. 290,357. (No model.) Patented in England October 27, 1887, No. 14,620; in France October 27, 1887, No. 186,625; in Canada November 3, 1887, No. 27,929, and in Belgium June 6, 1888, No. 82,074.

*To all whom it may concern:*

Be it known that I, CHARLES J. BAILEY, of Newton, county of Middlesex, State of Massachusetts, have invented an Improvement in Brushes, (patented in England, No. 14,620, October 27, 1887; France, No. 186,625, October 27, 1887; Canada, No. 27,929, November 3, 1887; Belgium, No. 82,074, June 6, 1888,) of which the following description, in connection with the accompanying drawings, is a specification, like letters on the drawings representing like parts.

This invention has for its object to construct a brush especially adapted as a flesh or bath brush.

In accordance with this invention the back and teeth of the brush are composed of rubber and formed integral, and are perfectly flexible throughout. The back is made of any convenient size and shape; but the teeth are made cylindrical and with their active ends flat.

In using the brush the flexible back enables it to conform to the hand of the user and also to irregularities of the body, the flat-ended teeth presenting a large extent of friction-surface to act on the skin, bringing the blood toward the surface and greatly stimulating and increasing the circulation, the teeth yielding so as not to abrade the skin, although the friction due to pressure of the teeth on the flesh is very considerable. With the flat-ended teeth the rubbing may be quite violent without abrasion of the skin. Use of truly cylindrical teeth admits of more teeth being employed than if conical teeth having truncated active ends of the same diameter as the cylindrical teeth were used, and by their compact arrangement enables water, particularly soapy water, to be much better retained, because if the teeth were conical the water would freely run off or escape from the points of the teeth.

Figure 1:
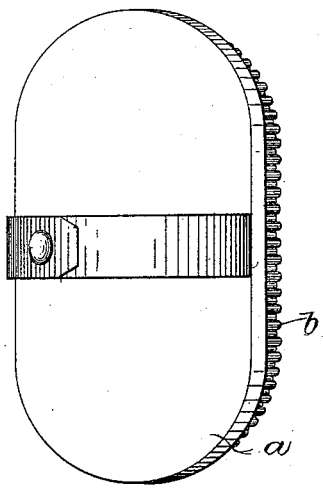
Figure 2:
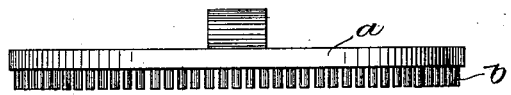

Figure 1 is a perspective view of a brush embodying this invention; Fig. 2, a side elevation of the brush, showing one row of teeth only; and Fig. 3, an under side view of the brush.

Figure 3:
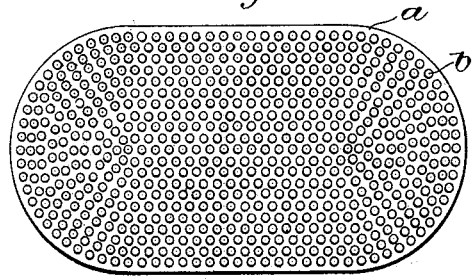

The back $a$ and teeth $b$ are made in one piece of soft rubber suitably vulcanized. The teeth $b$ are cylindrical and have flat-surfaced ends, as best shown in Figs. 2 and 3. The back $a$ is preferably slotted to receive a suitable handle, such, for instance, as shown in application for Letters Patent Serial No. 251,335, filed by me October 3, 1887.

The teeth herein shown, being in great numbers and close together and presenting large flat-surfaced ends, offer considerable resistance when drawn over the surface of the skin, and by the friction produced stimulate the skin and cause it to "glow" or redden without abrasion.

The teeth and back, being flexible, permit the brush to conform readily to all irregularities of the surface being acted upon.

The invention of cylindrical flat-ended teeth for a rubber brush is applicable to brushes for other purposes than the toilet or bath.

I claim—

The back $a$ and the cylindrical flat-ended teeth $b$, made integral with the back and of soft or flexible rubber and constituting a brush soft or flexible throughout, substantially as described.

In testimony whereof I have signed my name to this specification in the presence of two subscribing witnesses.

CHARLES J. BAILEY.

Witnesses:
 BERNICE J. NOYES,
 FREDERICK L. EMERY.